United States Patent [19]

Thoeren et al.

[11] Patent Number: 5,996,784
[45] Date of Patent: Dec. 7, 1999

[54] CIGARETTE PACK MADE FROM PLASTIC FILM

[75] Inventors: Klaus Thoeren, Wiesbaden-Amoeneburg; Horst Kromer; Ruth Aey, both of Wiesbaden, all of Germany

[73] Assignee: Hoechst Aktiengesellschaft, Frankfurt, Germany

[21] Appl. No.: 08/409,959

[22] Filed: Mar. 23, 1995

Related U.S. Application Data

[63] Continuation of application No. 08/099,528, Jul. 30, 1993, abandoned.

[30] Foreign Application Priority Data

Aug. 12, 1992 [DE] Germany .............................. 42 26 640

[51] Int. Cl.⁶ .............................. B65D 15/00; B65D 15/12
[52] U.S. Cl. ........................ 206/264; 206/271; 229/87.13
[58] Field of Search ........................ 229/87.13; 206/271, 206/264

[56] References Cited

U.S. PATENT DOCUMENTS 2,085,062  6/1937  Allen .
2,132,448  10/1938  Stephens .
2,767,900  10/1956  Bouteloup .
3,167,104  1/1965  Wiley et al. ........................ 206/264 X
3,387,736  6/1968  Williamson .............................. 206/264
4,351,433  9/1982  Barber et al. ........................... 206/264
4,375,989  3/1983  Mäkinen ................................. 106/300
4,842,187  6/1989  Janocha et al. ............................. 229/87

FOREIGN PATENT DOCUMENTS 0317818   5/1989  European Pat. Off. .
0 408 971  1/1991  European Pat. Off. .
0 475 110  3/1992  European Pat. Off. .
0479101   4/1992  European Pat. Off. .
946418    6/1949  France .
2123337   11/1972 Germany ............................... 206/271
2545256   4/1977  Germany .
3029766   2/1991  Japan ................................ 229/87.13
1023933   2/1965  United Kingdom .
1000443   8/1965  United Kingdom ............... 229/87.13
1021894   3/1966  United Kingdom .

*Primary Examiner*—David T. Fidei
*Attorney, Agent, or Firm*—Shanks & Herbert

[57] ABSTRACT

A cigarette pack is described which is made from a thermoplastic film. In addition, an opening device for opening cigarette film packs made from thermoplastics and a process for the production of an opening device are described.

12 Claims, 4 Drawing Sheets

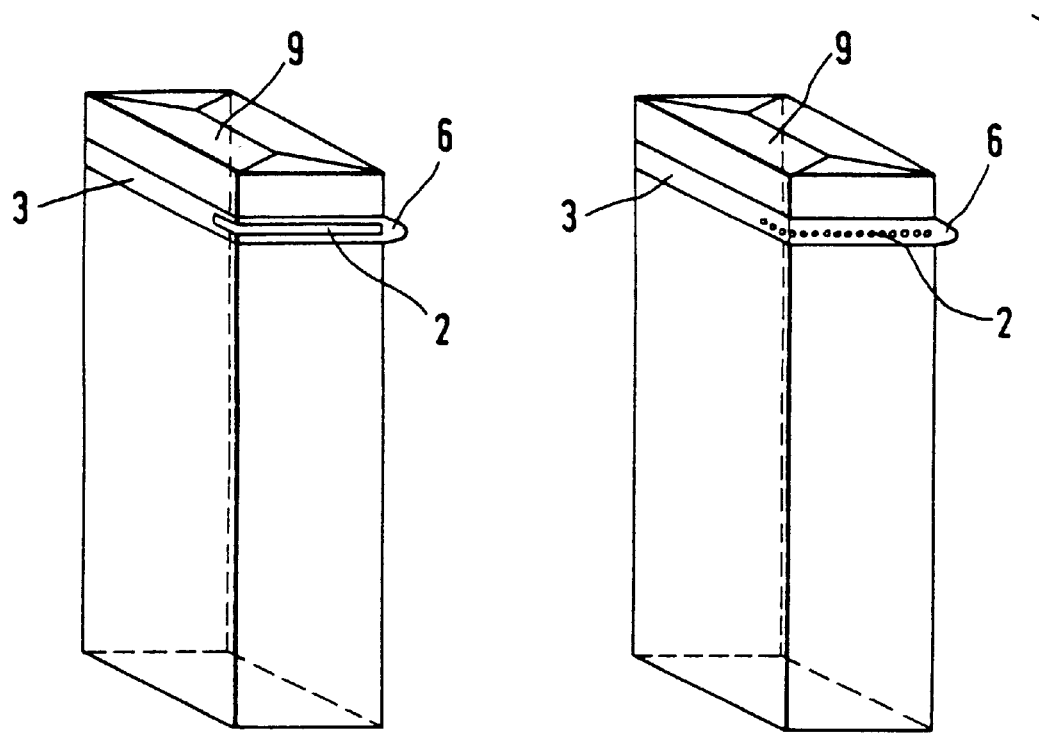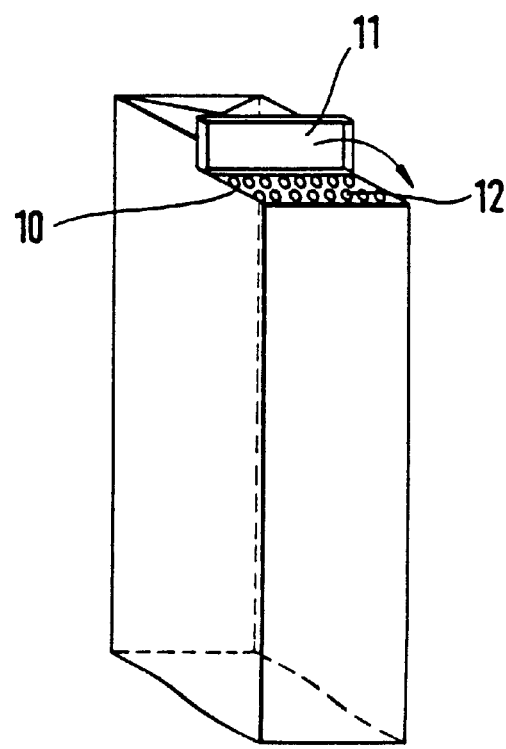
Fig.4

CIGARETTE PACK MADE FROM PLASTIC FILM

This application is a continuation, of application Ser. No. 08/099,528, filed Jul. 30, 1993, now abandoned.

BACKGROUND OF THE INVENTION

1. Field of the Invention

The present invention relates to a soft pack for cigarettes. The invention also relates to an opening device for opening the soft pack for cigarettes, and a method of making the opening device.

2. Description of Related Art

It is known to supply cigarettes in packs which comprise a plurality of wrappers of different materials. Typically, cigarette wrappers are made of a paper/aluminum composite, a paper tape or board, and a film as the outer wrapper. This pack simultaneously fulfills a number of functions required specifically for cigarette packs. These include, inter alia, good water vapor and gas barrier properties which are intended to protect the cigarettes against drying-out and loss of flavor. Also, good handling of the pack is ensured by a special tear-open device.

However, these conventional packs require multistage automatic systems which wrap the cigarettes in the individual layers. This usually involves considerable work and expense, the reduction of which is a constant need. With the advancing development of recyclable packaging systems, there is a growing demand for single-material packs whose recycling is, in principle, simpler. In this respect, the known cigarette packs are greatly in need of improvement.

SUMMARY OF THE INVENTION

An object of the present invention therefore is to provide a cigarette pack which avoids the disadvantages of the conventional pack. In particular, it is an object of the invention to provide a single-material pack for cigarettes which satisfies the functional requirements thereby exhibiting good barrier properties, good mechanical strength, good heat resistance, and the like. At the same time, the pack is easy to handle, and, in particular, easy to open. In addition, a good visual appearance of the pack is required. Finally, the pack nevertheless is inexpensive to produce and thus economically advantageous.

It also is an object of the invention to provide a cigarette pack having an opening device capable of opening the pack. A further object of the invention is to provide a process for producing a cigarette pack including the opening device.

These and other objects of the present invention are achieved by providing a cigarette pack consisting essentially of a thermoplastic film. These objects are further achieved by providing a cigarette pack with an opening device where the opening device also is made from a thermoplastic material and comprises a thermoplastic tape disposed on the side of the pack exposed to the atmosphere with a tab provided at the end of the tape. The thermoplastic tape is fixed in place over a nominal tear point in the film forming the pack.

These objects also are achieved by providing a process for the production of the opening device which comprises first applying a nominal tear point in a film in the form of a blank for a cigarette pack at a suitable point on the side of the pack which will be exposed to the atmosphere. Then, a thermoplastic tape is disposed over the nominal tear point and fixed in position over the nominal tear point. The cigarette pack blank then is trimmed by a cut edge which is not a straight line.

Further objects, features, and advantages of the present invention will become apparent to those skilled in the art from the detailed description which follows.

BRIEF DESCRIPTION OF THE DRAWINGS

FIG. 4 illustrates a cigarette pack.

DETAILED DESCRIPTION OF THE PREFERRED EMBODIMENTS

Figure 1:
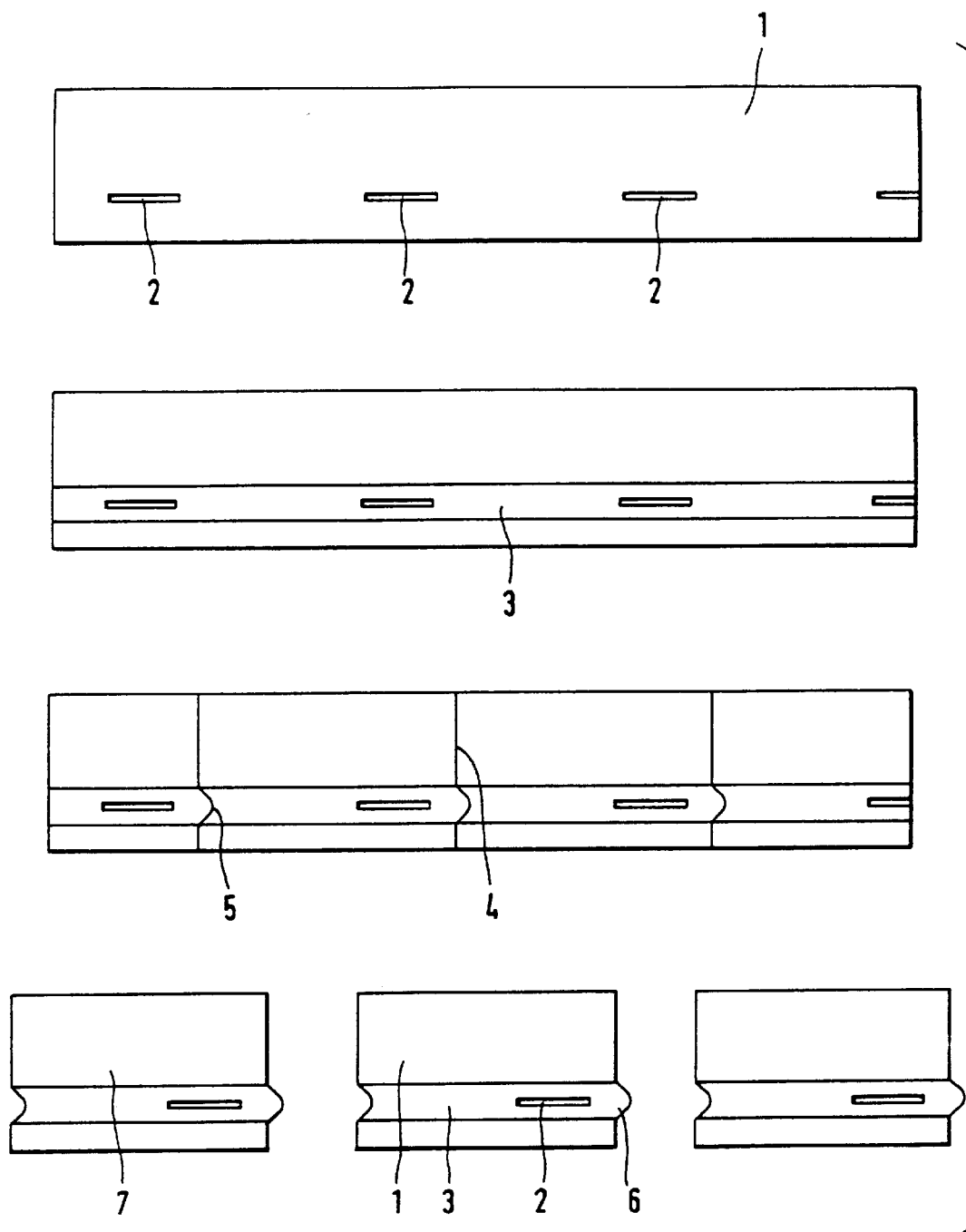
FIG. 1 illustrates a blank useful for producing a cigarette pack in accordance with the present invention.

As use throughout this description, the phrase "consisting essentially of a thermoplastic film" denotes a cigarette pack made only from one thermoplastic film, and does not include a cigarette pack made from a number of films, including a thermoplastic film outer wrapper. This phrase further denotes multi-layer thermoplastic films comprising interlayers and outer layers having various physical and chemical characteristics.

The thermoplastic film used as the cigarette pack can comprise any film which will give the desired characteristics set forth above. Preferred thermoplastic films are, in particular, films made from polyolefins, in particular, polypropylene films. Any known single-layer and multilayer polypropylene film can be used in the present invention. In particular, opaque films are preferred. Opaque polypropylene films are known in the art, and can be produced by methods well known to the skilled artisan. Useful films are described in, for example, EP-A-0 244 614, EP-B-0 044 515, EP-A-0 475 110, EP-A-0 408 971, U.S. Pat. Nos. 4,842,187 and 4,375,989, each of which are incorporated by reference in their entirety.

In general, these preferred films comprise a polypropylene base layer, which contains incompatible inorganic and/or organic particles. When the film is stretched, these incompatible particles produce vacuole-like cavities in the polymeric matrix which causes the optical effect known as opacity to light. Preferred additives include inorganic salts, such as, for example, $CaCO_3$, and spherical organic particles. Details of the type, size and amount of these additives are described in detail in the above documents.

The opaque films useful in the present invention preferably have one or more outer layers and/or interlayers which are selected depending on the properties required of the pack. Suitable outer layer materials comprise polypropylene homopolymers and conventional polypropylene copolymers, for example $C_2/C_3$- or $C_3/C_4$-copolymers, or propylene terpolymers, such as, for example $C_2/C_3/C_4$-terpolymers. Particularly preferred outer layer materials are mixtures of two or more of the homopolymers, copolymers and terpolymers.

Conventional additives in effective amounts may be added to the base layer and/or to the outer layers and/or interlayers. As used throughout the specification and claims, the term "conventional additives" is taken to mean those additives known to be useful in thermoplastic films, in particular, polyolefin films such as pigments, stabilizers, neutralizers, resins, antiblocking agents and antistatic agents. Details on favorable embodiments in this respect are also found in the documents described above.

In addition to opaque films, transparent films are also suitable. Transparent thermoplastic films also are known in the art. Any known transparent films can be used, in particular, those based on polyolefins. These films typically have a single- or multilayer structure and, very generally, comprise a core layer based on polypropylene. Outer layers can be used such as those described in connection with opaque films. In principle, all generally known layer structures as described in the publications previously mentioned are suitable in the present invention.

The thickness of the film can vary within broad limits depending on the desired results and is at least 20 $\mu$m, preferably from 50 $\mu$m to 200 $\mu$m, particularly preferably from 70 $\mu$m to 100 $\mu$m, with the base layer making up from about 50% to 80% of the total film thickness.

To improve the adhesion properties, the surfaces of the film can be corona- or flame-treated. Those skilled in the art recognize that it may be sufficient to treat one surface correspondingly. Corona and flame treatments are known and described, for example, in EP-B-0 160 889, and EP-B-0 281 893 and U.S. Pat. No. 4,615,906, all of which are incorporated by reference in their entirety.

In a particularly advantageous embodiment, the cigarette pack made from a thermoplastic film is provided with an opening device. The opening device also is an embodiment of the present invention.

It is known that polypropylene films have high tear strength, but at the same time low tear propagation strength. This makes the opening of packs made from these films difficult without additional aids. First, the pack cannot be torn at any given point on the pack in a simple manner. Second, if a tear point is positioned on the film, the tear point tears farther in an uncontrolled manner so that undesired and much too large openings are formed thereby permitting the contents of the pack to fall out in an uncontrolled manner. It is important, in particular for cigarette packs, that they are opened only so far that unused cigarettes can be stored therein without falling out too easily. Tear-open tapes, as used in conventional cigarette packs, result in precisely the uncontrolled tearing-open described above and are therefore unsuitable for the single-material pack made from thermoplastic film.

An additional embodiment of the invention provides a mechanism for opening packs made from thermoplastic films which does not have the above-described disadvantages.

This embodiment is an opening device which comprises a thermoplastic tape disposed on the side of the pack exposed to the atmosphere with a tab at the end of this tape. The tape is fixed in a position over a nominal tear point in the film which forms the pack, this tear point being applied at the point intended for opening.

Figure 2:
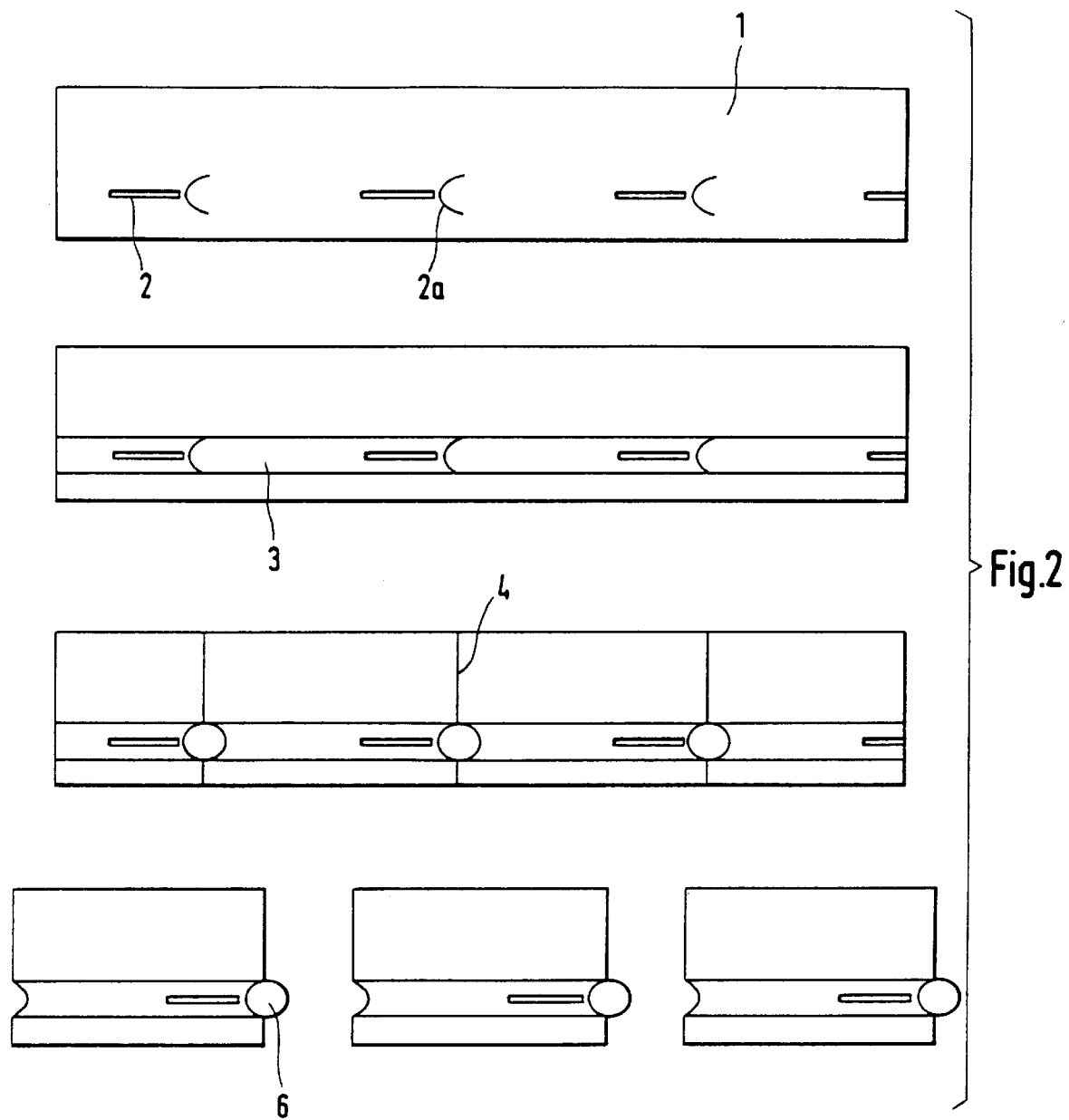
FIG. 2 illustrates another blank useful for producing a cigarette pack.

An opening device and cigarette pack useful in the present invention is shown in detail in FIGS. 1 to 4. FIGS. 1 and 2 illustrate the production of a blank useful for making a cigarette pack in accordance with the present invention. At a suitable point, the film 1 is provided in the longitudinal direction with nominal tear points 2, in particular with a slot or a perforation. A thermoplastic tape 3 is disposed over this slot and fixed in place. To achieve fixing the tape to the film, either a heat-seal is suitable or a self-adhesive tape with an adhesion-promoting coating is used.

The side of the film on which the tape is laid later forms the side of the pack which is exposed to the atmosphere. The individual blanks then are cut at a separation suitable in each case, where the cut edge 4 is not simply a straight line, but instead has, for example, the shape shown in FIG. 1. The U-shaped notch 5 forms the tab 6 which can have a variety of shapes. In this way, the blanks 7 shown with nominal tear point 2 having tape 3 disposed and fixed in a position over the tear point can be used directly for wrapping the cigarettes, thereby forming a cigarette pack.

FIG. 2 illustrates a further particularly advantageous embodiment for the blank which contains an even more favorable design of the tab 6. To this end, a U-shaped perforation 2a is stamped in the film so as to intersect with cut edge 4. The U-shaped perforation 2a is stamped simultaneously with, before or after the formation of nominal tear points 2, but before the tape 3 is disposed thereon. This U-shaped stamping 2a, when combined with the shape of the cut edge 4, gives an oval or circular tab 6, which is particularly advantageous since it offers twice the size and is therefore easier to grip.

In a particularly advantageous embodiment, the slot 2 is fixed in place at the upper and lower ends by suitable means in order to more effectively prevent undesired further tearing. For example, the cut ends are provided with a circular perforation or with a semicircular melt bead 8 as shown in FIG. 3.

Figure 3:
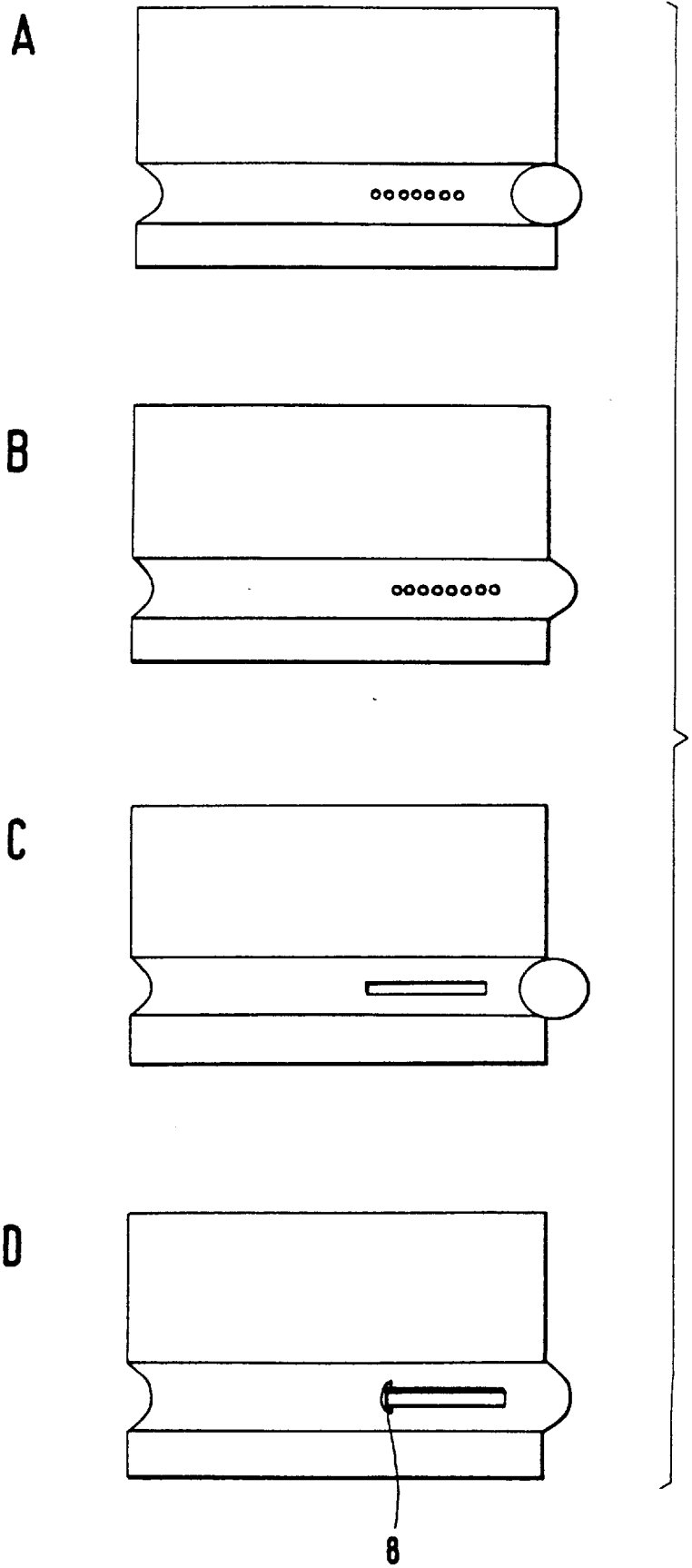
FIG. 3 illustrates additional blanks showing various embodiments of the invention.

FIG. 3 illustrates model blanks A to D, as arise from the various embodiments of the invention. Embodiments A and B each are a blank having a perforation as the nominal tear point and an oval or U-shaped tab. Embodiments C and D each are blanks having a slot as the nominal tear point. Embodiment D is additionally provided with a melt bead. Here too, still other designs with a circular or U-shaped notch as tab 6 are possible.

FIG. 4 illustrates the cigarette pack itself. The opening tape 3 runs below the end fold 9, and the slot or perforation 2 is applied at the same height as opening tape 3. During opening of the pack, the tab 6 is gripped and the tape is pulled off by simple removal, uncovering the pre-stamped slot. At this point 10, the end of the pack can then simply be folded up like a lid 11. Removal of the cigarettes 12 is simple. Subsequent folding down of the lid-like segment additionally prevents the remaining cigarettes from falling out.

In principle, other shapes of the tab are possible by modifying the stamping 2a and cut edge 4. Preference is given to all circular and U-shaped designs of the tab.

In accordance with the present invention, any known thermoplastic materials are suitable for the opening tape. The tape preferably consists essentially of polypropylene or polyester, it being preferred for the material to be oriented only monoaxially (in the longitudinal direction of the tape). In general, the tape is from 2 mm to 5 mm in width for the intended application in cigarette packs. However, the width can be chosen suitably depending on the application of the opening device.

The invention has been described in detail with reference to particularly preferred embodiments. Those skilled in the art will recognize that various modifications can be made without departing from the spirit and scope of the present invention.

What is claimed is:

1. A cigarette pack consisting essentially of a biaxially-oriented thermoplastic film wherein the film has a multilayer structure and has a thickness of from about 20 $\mu$m to 200 $\mu$m, wherein said cigarette pack further is provided with a device comprising a thermoplastic tape disposed on the side of the pack exposed to the atmosphere with a tab at the end of said tape wherein the tape is fixed in place over a nominal tear point in the thermoplastic film at the point intended for opening.

2. A cigarette pack as claimed in claim 1, wherein the film comprises a polypropylene film.

3. A cigarette pack as claimed in claim 1, wherein the film comprises an opaque polypropylene film.

4. A cigarette pack as claimed in claim 1, wherein the film comprises a transparent polypropylene film.

5. A cigarette pack as claimed in claim 1, wherein the multi-layered structure is selected from the group consisting of a two-layer, a three-layer, a four-layer and a five-layer structure.

6. A cigarette pack as claimed in claim 1, wherein the film is printed.

7. A cigarette pack as claimed in claim 1, wherein the tape is made of a thermoplastic material.

8. A cigarette pack as claimed in claim 1, wherein the tape is fixed in place by an adhesion-promoting layer.

9. A cigarette pack as claimed in claim 1, wherein the tape is fixed in place by heat-sealing.

10. A cigarette pack as claimed in claim 1, wherever the tab is stamped out over a cut edge of a blank.

11. A cigarette pack as claimed in claim 1, wherein the tab is produced by a two-stage stamping process.

12. A cigarette pack comprising a plurality of cigarettes wrapped in a material consisting essentially of a thermoplastic film, wherein the cigarette pack is made from a thermoplastic film having a multi-layer structure and having a thickness of from about 20 $\mu$m to 200 $\mu$m, wherein said cigarette pack further is provided with a device comprising a thermoplastic tape disposed on the side of the pack exposed to the atmosphere with a tab at the end of said tape, wherein the tape is fixed in place over a nominal tear point in the thermoplastic film at the point intended for opening.

* * * * *